(12) United States Patent
Oliver et al.

(10) Patent No.: US 6,690,945 B1
(45) Date of Patent: Feb. 10, 2004

(54) METHOD FOR SUPPRESSING TRANSIENTS USING A PULSE SHAPING LOOK-UP TABLE

(75) Inventors: John P. Oliver, Chicago, IL (US); James C. Baker, Crystal Lake, IL (US); John J. Janssen, Round Lake Beach, IL (US)

(73) Assignee: Motorola, Inc., Schaumburg, IL (US)

( * ) Notice: Subject to any disclaimer, the term of this patent is extended or adjusted under 35 U.S.C. 154(b) by 607 days.

(21) Appl. No.: 09/619,932

(22) Filed: Jul. 20, 2000

Related U.S. Application Data

(63) Continuation of application No. 09/124,208, filed on Jul. 28, 1998.

(51) Int. Cl.[7] .................................................. H04Q 7/32
(52) U.S. Cl. ..................... 455/550.1; 455/116; 455/91; 455/95; 455/104; 455/517; 375/312; 375/229; 375/262; 375/281
(58) Field of Search .............................. 455/116, 91, 95, 455/104, 517, 422.1, 403, 423, 424, 425, 67.1, 550.1, 67.3, 296, 222; 375/312, 229, 262, 281, 331

(56) References Cited

U.S. PATENT DOCUMENTS

| | | |
|---|---|---|
| 4,843,613 A | 6/1989 | Crowle |
| 4,941,191 A | 7/1990 | Miller et al. |
| 5,121,412 A | 6/1992 | Borth |
| 5,144,434 A | 9/1992 | Yamashita et al. |
| 5,420,887 A | 5/1995 | Rhodes et al. |
| 5,600,678 A | 2/1997 | Petranovich et al. |
| 5,621,763 A | 4/1997 | Walczak et al. |
| 5,642,378 A | 6/1997 | Denheyer et al. |
| 5,673,291 A | 9/1997 | Dent |
| 5,832,022 A | 11/1998 | Scott |
| 5,857,003 A | 1/1999 | Geiger et al. |

*Primary Examiner*—William Trost
*Assistant Examiner*—Keith Ferguson
(74) *Attorney, Agent, or Firm*—Sylvia Y. Chen; Roland K. Bowler, II

(57) ABSTRACT

The pulse-shaping look-up table with transient suppression (530) avoids hard turn-on and turn-off transients by modifying word segments of initial and final digital words during transmission of a digital data sequence. A controller (570) sends a mode signal and a digital data sequence to the pulse-shaping look-up table with transient suppression (530). A mode buffer and command block (560) uses the mode signal to control the creation of initial and final digital words created by a data buffer and control block (550) from the digital data sequence. The digital words are used by a look-up table (540) to create a sampled digital output waveform sequence. The pulse-shaping look-up table with transient suppression (530) provides an accurate output waveform sequence with reduced spectral emissions even during start-up and shut-down of digital data transmissions.

15 Claims, 4 Drawing Sheets

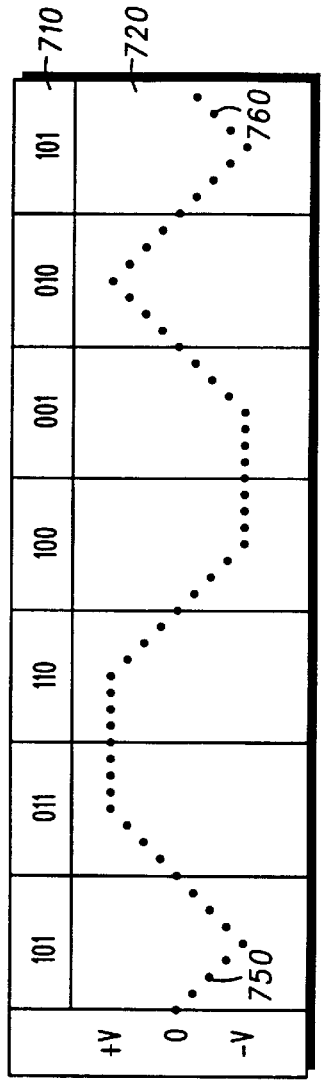

METHOD FOR SUPPRESSING TRANSIENTS USING A PULSE SHAPING LOOK-UP TABLE

This application is a continuation of application Ser. No. 09/124,208, filed Jul. 28, 1998.

CROSS REFERENCE TO RELATED APPLICATION

This application is related to U.S. patent application Ser. No. 09/124,200 filed by John J. Janssen et al. on even date herewith and entitled "Transient-Suppressing Mode Switch." The related application is assigned to the assignee of the present application and hereby incorporated herein in its entirety by this reference thereto.

FIELD OF THE INVENTION

This invention relates generally to pulse shaping of digital data, and more particularly to using look-up tables to accomplish pulse-shaping.

BACKGROUND OF THE INVENTION

In wireless communications systems, pulse-shaping of digital data is usually needed to meet system spectral emission requirements. Instead of using conventional filters to shape pulses, however, a look-up table is often used to approximate the filtering operation and reduce the cost and complexity of the pulse-shaping operation. The digital data is translated into digital words, and a look-up table maps each digital word to an output waveform segment stored in the table. Due to the look-up table, the first output waveform segment in a pulse-shaping digital data output waveform sequence may have an abrupt transition from a zero value to a positive or negative value. Likewise, the last output waveform segment in an output waveform sequence may have an abrupt transition from a positive or negative value to a zero value. These turn-on and turn-off transients may cause unacceptable spectral emissions.

Thus, there is a need for a pulse-shaping look-up table that reduces the turn-off and turn-on transients caused by traditional pulse-shaping look-up tables.

BRIEF DESCRIPTION OF THE DRAWINGS

FIG. 3 shows a table of digital word modifications that reduce turn-on transients.

FIG. 4 shows a table of digital word modifications that reduce turn-off transients.

FIG. 7 shows a use of the pulse-shaping look-up table with transient suppression shown in FIG. 6.

DETAILED DESCRIPTION OF THE PREFERRED EMBODIMENTS

The pulse-shaping look-up table with transient suppression avoids hard turn-on and turn-off transients by modifying word segments of initial and final digital words during transmission of a digital data sequence. The pulse-shaping look-up table with transient suppression matches the modified digital words to waveform segments to provide an accurate output waveform sequence with reduced spectral emissions even during start-up and shut-down of digital data transmissions.

Figure 1:
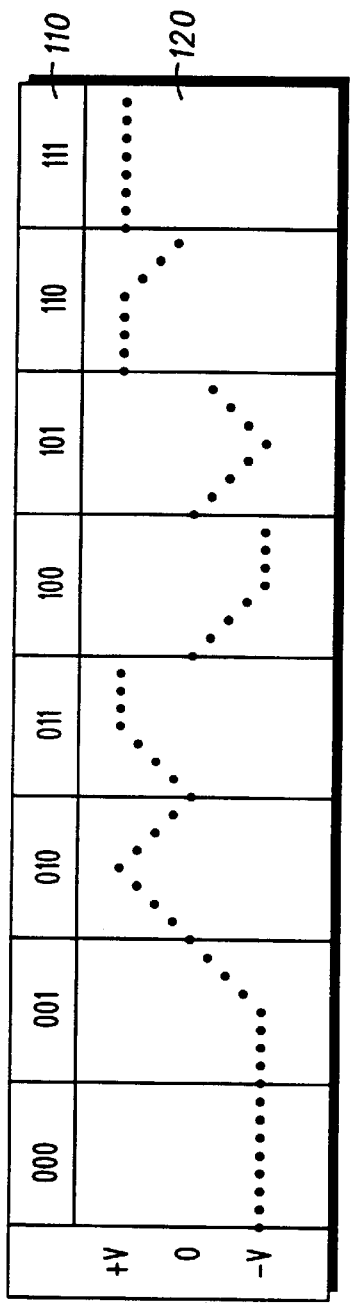
FIG. 1 shows an example pulse-shaping look-up table.

FIG. 1 shows an example pulse-shaping look-up table. In look-up table 100, a digital word listed in row 110 has three word segments matched to a sampled digital waveform segment shown in row 120. In this example, each word segment is one bit long and the words of the input digital data sequence are also one bit long. The center one-bit word segment of the digital word represents the present one-bit word of the input digital data sequence while the first, or left, one-bit word segment of the digital word represents the past one-bit word of the input digital data sequence and the last, or right, one-bit word segment of the digital word represents the future one-bit word of the input digital data sequence.

Figure 2:
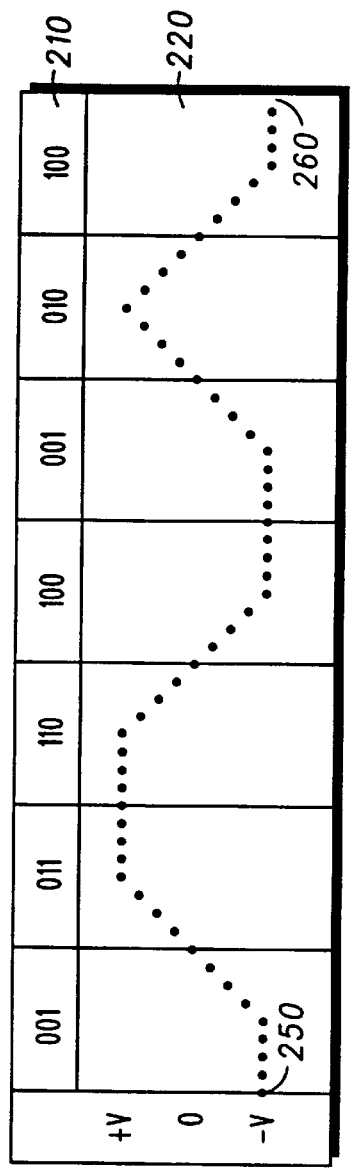
FIG. 2 shows an example use of the pulse-shaping look-up table shown in FIG. 1.

FIG. 2 shows an example use of the pulse-shaping look-up table shown in FIG. 1. In this example, the input digital data sequence will be a seven-word binary sequence {0110010} with each word being one bit in length. Before the input digital data sequence begins, the pulse-shaping look-up table may receive digital data, however, those digital data are not representative of desired information. Thus, the first digital word is X01. The past word segment X represents an undetermined digital value, the present word segment 0 is the first word of the input digital data sequence, and the future word segment 1 is the second word of the input digital data sequence. In this example, the past word segment X is presumed to be 0 as shown in row 210. The remainder of the binary digital words corresponding to the seven-word input digital data sequence is also shown in row 210, The second digital word is 011, the third digital word is 110, the fourth digital word is 100, the fifth digital word is 001, and the sixth digital word is 010. The seventh digital word is 10X, because the future word segment in the last digital word is an undetermined value. The future word segment X in the seventh digital word is presumed to be 0 as shown in row 210.

Note that in order to map the first and last digital words to a corresponding waveform segment shown in FIG. 1, an assumption must be made about the value of each word segment X. If word segment X is assumed to be 0, the sampled digital output waveform sequence shown in row 220 results. Note the hard turn-on transient 250 at the beginning of the output waveform sequence and the hard turn-off transient 260 at the end of the output waveform sequence. These transients 250, 260 cause unacceptable spectral emissions in certain communication systems. Regardless of whether word segment X is set to 0, 1, or allowed to be a random value, turn-on or turn-off transients will result under certain circumstances. Thus, there needs to be a method for setting the value of each word segment X to reduce these transients.

FIG. 3 shows a table 300 of digital word modifications that reduce turn-on transients. Digital word modifications will be slightly different for each type of pulse-shaping look-up table. The teachings described herein can easily be applied to Bessel, square root raised cosine (SRRC), Gaussian, and other types of pulse-shaping look-up tables as well as the example look-up table shown in FIG. 1. The basis for the modifications shown in FIG. 3 is to ensure that the beginning of the output waveform sequence produced by the look-up table is a gradual transition from a zero value rather than an abrupt transition.

Depending on the value of the first word in an input digital data sequence, the past word segment X in the first digital word will be set to a certain value. Regarding the look-up table shown in FIG. 1, for input digital data sequences that start with the word 0, the past word segment in the first digital word is set to 1. Thus, using the example digital data sequence of {01100101} shown in FIG. 2, instead of using the first digital word of 001 shown in FIG. 2., the first digital word is 101. For digital data sequences that start with the word 1, the past word segment of the first digital word is set to 0. These modifications to the first digital word shown in the table 300 create a smooth transition from a zero value to a positive or negative value at the beginning of an output waveform sequence.

FIG. 4 shows a table 400 of digital word modifications that reduce turn-off transients. Again, the digital word modifications will be slightly different for each type of pulse-shaping look-up table. The modifications are designed to produce gradual transitions to a zero value at the end of an output waveform sequence.

Depending on the value of the last word of an input digital data sequence, the future word segment X in the last digital word will be set to a certain value. Regarding the look-up table shown in FIG. 1, for digital data sequences that end in the word 0, the future word segment of the final digital word is set to a 1. For digital data sequences that end in the word 1, the future word segment of the final digital word is set to 0. Thus, using the example digital data sequence of {0110010} shown in FIG. 2, instead of the last digital word of 100 shown in FIG. 2, the last digital word is 101. The modifications to the last digital word shown in the table 400 create a smooth transition from a positive or negative value to a zero value at the end of an output waveform sequence.

Figure 5:
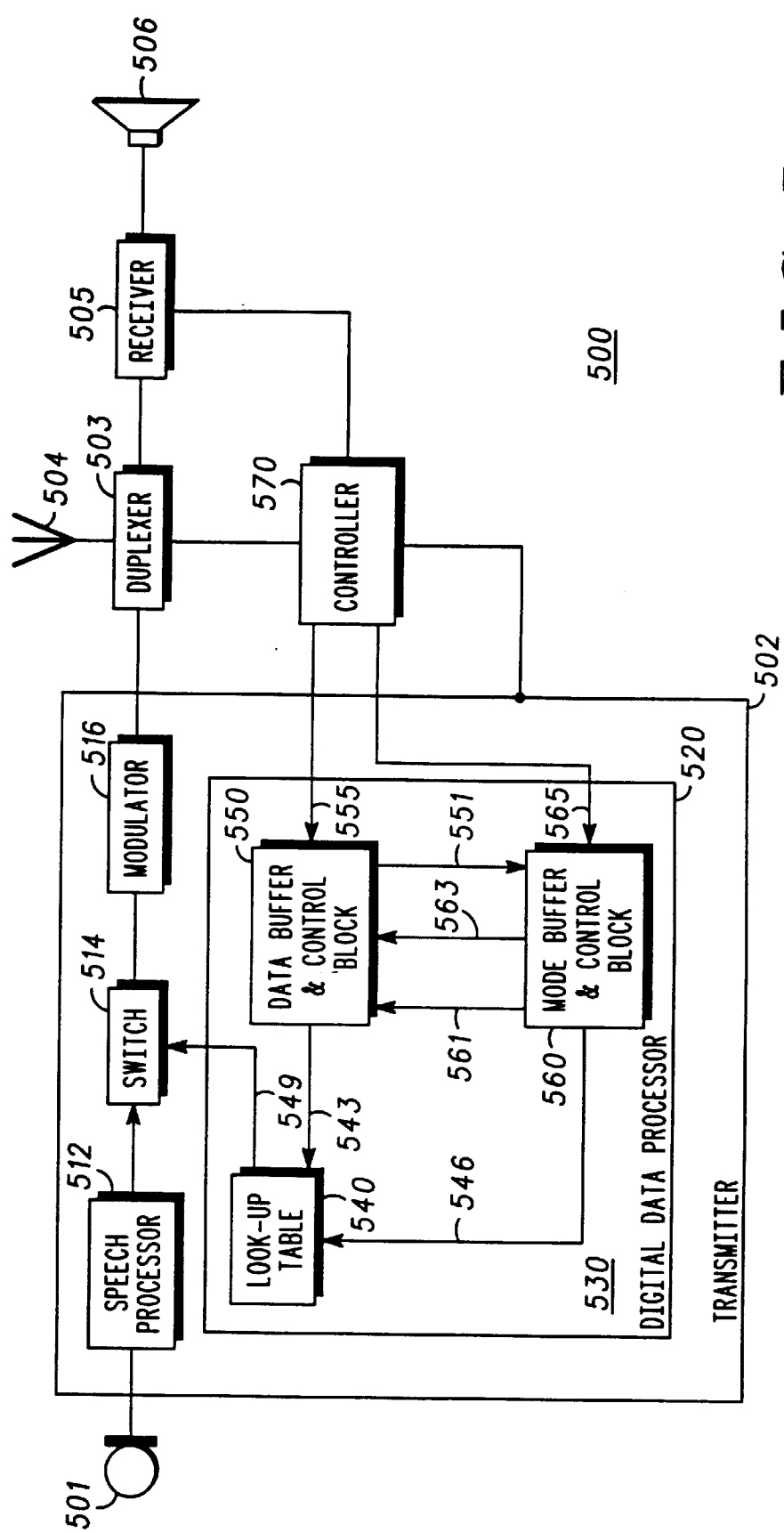
FIG. 5 shows a block diagram of a preferred embodiment of a pulse-shaping look-up table with transient suppression implemented in a transmitter of a radiotelephone.

FIG. 5 shows a block diagram of a preferred embodiment of a pulse-shaping look-up table with transient suppression 530 implemented in a transmitter 502 of a cellular radiotelephone 500. The radiotelephone 500 includes a microphone 501 attached to the transmitter 502. A speech processor 512 in the transmitter 502 processes audio signals from the microphone 512. A digital data processor 520 in the transmitter 502 processes digital data signals from a controller 570. Data signals from the controller 570 can include keypress information from a keypad (not shown) of the radiotelephone 500, or call set-up, power control, and hand-off control signals generated by the controller 570, speech as well as other digital data.

A switch 514 selects either a signal from the speech processor 512 or a signal from the digital data processor 520 for modulation by a modulator 516. This switch is described in more detail in U.S. patent application Ser. No. 09/124,200 filed by John J. Janssen et al. on even date herewith and entitled "Transient-Suppressing Mode Switch." The transmitter 502 is connected to a duplexer 503 and an antenna 504. Transmitted signals are broadcast from the antenna 504 and received by a counterpart receiver in a device such as a cellular base station (not shown). Signals received by the antenna 504 are sent by the duplexer 503 to a receiver 505 connected to a speaker 506. The controller 570 also controls the interactions of the transmitter 502, duplexer 503, and receiver 505.

The pulse-shaping look-up table with transient suppression 530 can also be implemented in other types of transceivers that transmit digital data on an intermittent basis, such as modems or facsimile machines or digital transceivers. Radiotelephones that are capable of transmitting both analog and digital data and other radiotelephones, such as digital cellular telephones that are able to transmit only intermittent digital data, can implement the pulse-shaping look-up table with transient suppression to reduce the spectral emissions created during start-up and shut-down of the digital data transmissions.

The look-up table 540 implements a pulse-shaping look-up table such as the example table 100 shown in FIG. 1. The look-up table 540 creates a sampled digital waveform segment for each input digital word. The look-up table 540 has an output port 549 that generates the sampled digital waveform segments as a sampled digital output waveform sequence, a digital word port 543 connected to a data buffer and control block 550, and a data enable port 546 connected to a mode buffer and command block 560. The mode buffer and command block 560 has a mode input port 565 connected to the controller 570. When the mode input port 565 is low, which indicates that the digital data mode is off, the mode buffer and command block 560 drives the data enable port 546 low, and the output port 549 of the look-up table 540 produces a zero value waveform regardless of the signals present at the digital word port 543.

When a data mode commences, the mode input port 565 is driven high and a digital data sequence is clocked into the data buffer and control block 550 through data input port 555. The mode buffer and command block 560 pulls the data enable port 546 high, which instructs the look-up table 540 to accept valid input from the digital word port 543.

At the beginning of a digital data sequence, when the mode input port 565 transitions from a low signal to a high signal, the start line 561 is driven by the mode buffer and command block 560 to control the creation of the digital word generated by the data buffer and control block 550 according to the table shown in FIG. 3 to reduce a turn-on transient, because the present word in the data buffer and control block 550 is the first word of the input digital data sequence. The first digital word is connected to the digital word port 543 of the look-up table 540 and the sampled digital waveform segment corresponding to the digital word is created and connected to the output port 549. Preferably the digital waveform segment is oversampled to create a smoother output waveform sequence at output port 549.

The data line 551 from the data buffer and control block 550 to the buffer and command block 560 contains information concerning the present word segment. This present word segment information is used by the mode buffer and command block 560 to set the value of the past word segment X of a first digital word using the start line 561 or the future word segment X of a last digital word using the stop line 563. Depending on the value of the present word segment, the value of an undetermined word segment X is set according to the tables shown in FIG. 3 and FIG. 4 to reduce turn-on and turn-off transients.

If the input data at data input port 555 is not the beginning of a data sequence, the mode input port 565 signal is a constant high signal, and no modification of digital words occurs. Thus, the data buffer and control block 550 accepts words of the digital data sequence at the data input port 555, creates digital words, and provides the digital words to the digital word port 543 of the look-up table 540. The look-up table 540 matches each digital word to a corresponding waveform segment using a table such as the sample table 100 shown in FIG. 1, oversamples the waveform segment, and transmits the oversampled waveform segments to the output port 549 to continue the sampled digital output waveform sequence.

When the controller 570 ends the data mode, the mode input port 565 transitions from a high signal to a low signal. Depending on the information regarding the present word segment on data line 551, the mode buffer and command block 560 controls the stop line 563 to instruct the data buffer and control block 550 to modify the digital word according to the table 400 shown in FIG. 4, because the present word segment in the data buffer and control block 550 is the final word of the input digital data sequence. The data enable port 546 is pulled low after the last digital word has been sent to the look-up table 540. This procedure reduces turn-off transients in the output waveform sequence.

Figure 6:
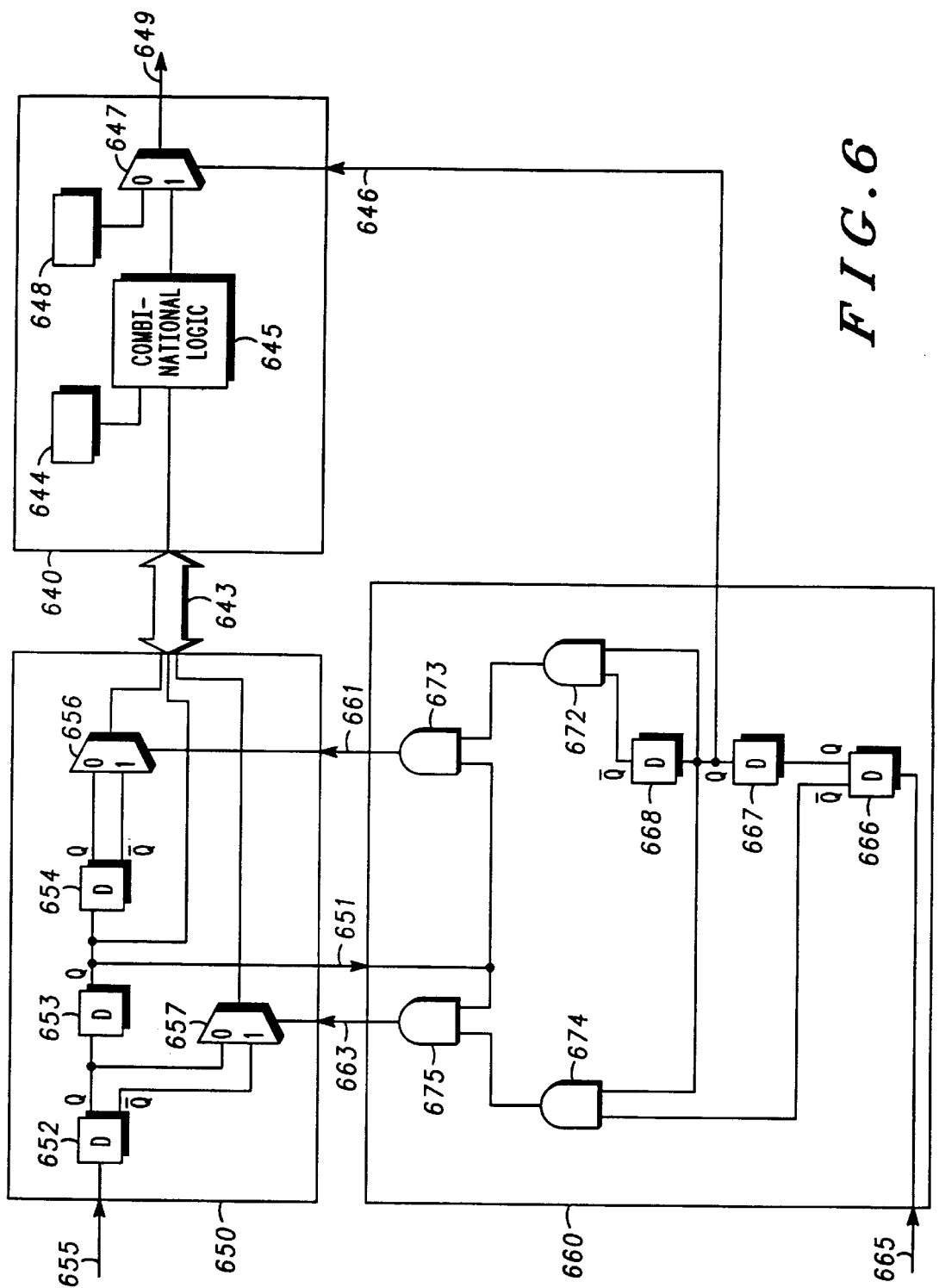
FIG. 6 shows a logic element diagram of a preferred implementation of the pulse-shaping look-up table with transient suppression shown in FIG. 5.

FIG. 6 shows a logic element diagram of a preferred implementation of the block diagram of the pulse-shaping look-up table with transient suppression 530 shown in FIG. 5. Data input port 655 of data buffer and control block 650 receives binary symbols from the controller 570 shown in FIG. 5. The binary symbols are buffered into three delay (D) flip-flops 652, 653, 654. The center D flip-flop 653 holds the present one-bit word segment according to the look-up table scheme previously described, the right D flip-flop 654 holds the past one-bit word segment, and the left D flip-flop 652 holds the future one-bit word segment. If the digital words going to the look-up table 640 are not to be modified by the mode buffer and command block 660, the 0 inputs to the multiplexers 656, 657 are selected and the digital words are sent via a three-word (i.e., three-bit) bus to the digital word port 643 of the look-up table 640.

Upon starting a digital data sequence, the normally low signal to the mode input port 665 is pulled high. This mode signal is buffered into three D flip-flops 666, 667, 668. Logic AND gates 672, 673 use the outputs of D flip-flops 667, 668 and the value of the present word in D flip-flop 653 as transferred from data buffer and control block 650 through data line 651 to create a control signal on the start line 661. The signal on the start line 661 alters the first (i.e., past) one-bit word segment of a digital word according to the table shown in FIG. 3 using a multiplexer 656 having a 0 input coupled to the Q output of the D flip-flop 654 and a 1 input coupled to the Q-BAR (i.e., not-Q) output of the D flip-flop 654. The Q-BAR output represents an alternative word segment.

When a stream of digital data ends, the signal to the mode input port 665 is pulled low. Logic AND gates 674, 675 use the outputs of D flip-flops 666, 667 and the value of the present word in D flip-flop 653 as transferred using data line 651 to create a control signal for the stop line 663. The signal on the stop line 663 sets the last (i.e., future) one-bit word segment of a digital word according to the table shown in FIG. 4 using the multiplexer 657 having a 0 input coupled to the Q output of the D flip-flop 652 and a 1 input coupled to the Q-BAR (i.e., not-Q) output of the D flip-flop 652. The Q-BAR output represents an alternative word segment.

The digital words are coupled to look-up table 640 through digital word port 643. The look-up table 640 includes an oversampling counter 644. In this embodiment, the counter 644 is a modulo-eight (8) counter, which creates eight-times oversampling to result in a smoother sampled digital output waveform sequence from the look-up table. An output of combinational logic 645 is coupled to a 1 input of a multiplexer 647. A 0 input of the multiplexer 647 is coupled to a zero value waveform generator 648 that in this embodiment produces an eight-bit parallel two's complement value of zero. The multiplexer 647 is controlled by the signal from a data enable port 646 which is produced by the D flip-flop 667 in the mode buffer and command block 660. Thus, after the signal at the mode input port 665 has been pulled high, the waveform at the output port 649 of the look-up table 640 will transfer from a zero value output to a sampled digital output waveform sequence reflective of the input digital data sequence from data input port 655 as modified by the data buffer and control block 650 and the mode buffer and command block 660 to reduce transients.

Other types of control circuits, such as a microprocessors or state machines, may be substituted for the buffers and digital logic shown here.

FIG. 7 shows a use of the pulse-shaping look-up table with transient suppression shown in FIG. 6. The example digital data sequence will be the same seven-word binary sequence {0110010} used in conjunction with FIG. 2. According to the table 300 shown in FIG. 3, the first digital word created by the data buffer and control block 550 shown in FIG. 5 is 101 as shown in row 710. The second, third, fourth, fifth, and sixth digital words shown in row 710 are identical to the second, third, fourth, fifth, and sixth digital words shown in row 210 of prior art FIG. 2. The seventh and last digital word, however, has been created according to the table 400 shown in FIG. 4. Thus, the final digital word from the data buffer and control block 550, before the data mode is completed, is 101 as shown in row 710. The digital words in row 710 are mapped to waveform segments shown in row 720 according to the example table 100 shown in FIG. 1. Note that the turn-on transient 250 and turn-off transient 260 shown in FIG. 2 have been replaced with smooth transitions 750, 760 from a zero value to a negative value and vice versa.

The pulse-shaping look-up table with transient suppression retains the benefits of look-up table pulse-shaping while reducing turn-on and turn-off transients. While specific components and functions of the pulse-shaping look-up table with transient suppression are described above, fewer or additional functions could be employed by one skilled in the art within the true spirit and scope of the present invention. The invention should be limited only by the appended claims.

We claim:

1. A method for transient suppression at an output of a digital filter, the method comprising:

determining whether an end word of a sequence of words will produce a transient at the digital filter output, the end word is a first word or a last word of the sequence of words;

appending a transition word to the end word of the sequence of words if the end word will produce a transient at the digital filter output;

providing the transition word appended to the sequence of words and at least a portion of the sequence of words to which the transition word is appended to an input of the digital filter.

2. The method of claim 1, determining whether the end word of the sequence of words will produce a transient at the digital filter output includes determining whether the end word of the sequence of words and a word adjacent to the end word will produce a transient at the digital filter output.

3. The method of claim 1, determining whether an end word of a sequence of words will produce a transient at the digital filter output includes determining whether the first word of the sequence of words will produce a transient at the digital filter output.

4. The method of claim 1, determining whether an end word of a sequence of words will produce a transient at the digital filter output includes determining whether the last word of the sequence of words will produce a transient at the digital filter output.

5. The method of claim 1,
the digital filter is a look-up table digital filter,
providing the transition word appended to the sequence of words and at least a portion of the sequence of words to which the transition word is appended to an input of the look-up table digital filter.

6. The method of claim 1, the appended transition word not limited to zero value.

7. A method for transient suppression at an output of a digital filter, the method comprising:
appending a transition word to an end word of a sequence of words if the end word will produce a transient at the digital filter output,
the end word is a first word or a last word of the sequence of words;
providing the transition word appended to the sequence of words and at least a portion of the sequence of words to which the transition word is appended to an input of the digital filter.

8. The method of claim 7,
selecting the transition word depending on the end word.

9. The method of claim 7,
selecting the transition word depending on the end word and a word adjacent the end word.

10. The method of claim 7,
appending the transition word to the end word of the sequence of words if the end word will not produce a transient at the digital filter output,
providing the transition word appended to the sequence of words and at least a portion of the sequence of words to which the transition word is appended to an input of the digital filter.

11. The method of claim 7, the appended transition word not limited to zero value.

12. A method for conditioning a sequence of words prior to input to a look-up table digital filter, the method comprising:
determining whether an end word of a sequence of words will produce a transient at the look-up table digital filter output,
the end word is a first word or a last word of the sequence of words;
appending a transition word to the end word of the sequence of words if the end word will produce a transient at the look-up table digital filter output.

13. The method of claim 12,
appending the transition word to the end word of the sequence of words if the end word will not produce a transient at the digital filter output.

14. The method of claim 12,
selecting the transition word depending on the end word.

15. The method of claim 12, the appended transition word not limited to zero value.

* * * * *